(12) United States Patent
Rattapon et al.

(10) Patent No.: US 8,118,126 B2
(45) Date of Patent: Feb. 21, 2012

(54) STEERING ASSIST SYSTEM AND STEERING ASSIST METHOD

(75) Inventors: Chumsamutr Rattapon, Susono (JP); Seiji Kawakami, Susono (JP); Katsuhiko Iwazaki, Nishikamo-gun (JP); Hiroaki Kataoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 12/310,046

(22) PCT Filed: Aug. 21, 2007

(86) PCT No.: PCT/IB2007/002388
§ 371 (c)(1), (2), (4) Date: Feb. 9, 2009

(87) PCT Pub. No.: WO2008/023238
PCT Pub. Date: Feb. 28, 2008

(65) Prior Publication Data
US 2009/0194350 A1    Aug. 6, 2009

(30) Foreign Application Priority Data
Aug. 22, 2006    (JP) ................................ 2006-225659

(51) Int. Cl.
*B62D 6/00*    (2006.01)
(52) U.S. Cl. ........................... 180/168; 180/169; 701/41
(58) Field of Classification Search .................. 180/168, 180/169, 443, 446, 167; 701/41, 42, 43
See application file for complete search history.

(56) References Cited

U.S. PATENT DOCUMENTS

| | | | |
|---|---|---|---|
| 6,493,619 B2 * | 12/2002 | Kawazoe et al. ................. | 701/41 |
| 6,580,987 B2 * | 6/2003 | Sadano et al. .................... | 701/41 |
| 7,069,129 B2 * | 6/2006 | Iwazaki et al. ................... | 701/41 |
| 7,510,038 B2 * | 3/2009 | Kaufmann et al. ............ | 180/169 |
| 2004/0262063 A1 | 12/2004 | Kaufmann et al. | |

FOREIGN PATENT DOCUMENTS

| | | |
|---|---|---|
| EP | 1 602 552 A2 | 12/2005 |
| JP | A-10-203394 | 8/1998 |
| JP | A-11-245832 | 9/1999 |
| JP | A-2000-198458 | 7/2000 |
| JP | A-2001-010518 | 1/2001 |
| JP | A-2002-120744 | 4/2002 |
| JP | A-2005-343260 | 12/2005 |

OTHER PUBLICATIONS

Mechanical translation of JP 2005-343260, cited by Applicant.*

* cited by examiner

*Primary Examiner* — John Walters
(74) *Attorney, Agent, or Firm* — Oliff & Berridge, PLC (57) ABSTRACT

A steering assist system for applying a steering torque reduces the influence of a time-dependent steering control amount on an assist steering torque when a predetermined driving operation by a driver is detected. Thus, the influence of the time-dependent steering control amount on the applied steering torque, which increases when the period of time over which actual moving state deviates from the target moving state increases is reduced when the driver makes the predetermined driving operation. Thus, it is possible to avoid the problem where steering feel degrades because the steering torque increases over time.

15 Claims, 7 Drawing Sheets

STEERING ASSIST SYSTEM AND STEERING ASSIST METHOD

BACKGROUND OF THE INVENTION

1. Field of Invention

The present invention relates to a steering assist system and a steering assist method that applies appropriate steering torque to assist a vehicle to run along a roadway.

2. Description of Related Art

Conventional steering assist systems acquire the shape of the roadway before the vehicle, determine the required steering torque that will allow the vehicle to travel along the roadway, and apply the required steering torque to the vehicle to relieve a driver of the burden of driving. In order to reduce the deviation of the vehicle from the center line of the roadway due to the influence of the incline of the road, some conventional steering assist systems calculate a target lateral acceleration based on an integral of the lane offset, which is the amount of lateral deviation between the vehicle center line and the center line of the roadway, with respect to time to generate a steering torque required to achieve the target acceleration. (See Japanese Patent Application Publication No. 2005-343260 (JP-A-2005-343260), for example.)

In conventional steering assist systems, when the vehicle deviates from the center line of the roadway, a steering torque responsive to the integral is generated so that the vehicle is controlled to move along the center line of the roadway. In such conventional steering assist systems, however, a steering torque may be applied even if no steering assist is necessary, and thus the driver may feel uncomfortable while performing a steering operation. For example, if the driver is driving intentionally off the center line of the roadway, a steering torque is calculated based on the integral even if the lane offset may be small. As a result, the cumulative steering torque increases over time, which may degrade the steering feel. In this way, the conventional steering assist systems have the problem as described above when there is such a time-dependent steering control amount, if not an integral, that increases the applied steering torque the longer the period of time that the actual moving state of the vehicle deviates from the target moving state.

SUMMARY OF THE INVENTION

A steering assist system in accordance with the present invention includes: a roadway acquisition module that acquires a shape of a roadway on which a vehicle is moving; a target moving state determining module that determines a target moving state for the vehicle based on the acquired shape of the roadway; an actual moving state determining module that determines the actual moving state of the vehicle; a time-dependent steering control amount acquisition module that acquires a time-dependent steering control amount, the time-dependent steering control amount being a steering control amount based on which a steering torque to be applied to the vehicle is determined and which depends on time, and the time-dependent steering control amount increases as a time period which the target moving state deviates from the actual moving state, in order to reduce the deviation between the actual moving state and the target moving state; a steering torque application module that applies a steering torque based on at least the time-dependent steering control amount; a driving operation detection module that detects a predetermined driving operation by a driver; and a control module that reduces the influence of the time-dependent steering control amount on the steering torque to be applied when the predetermined driving operation by the driver is detected.

According to a first aspect, the roadway acquisition module acquires the shape of the roadway, and the target moving state acquisition module acquires the target moving state. In addition, the actual moving state determining module determines the actual moving state, and the time-dependent steering control amount acquisition module acquires the time-dependent steering control amount. At this time, the steering torque application module applies a steering torque to the vehicle in such a way that the influence of the time-dependent steering control amount on the steering torque to be applied is reduced when the predetermined driving operation by the driver is detected by the driving operation detection module.

Thus, according to the above first aspect, the influence of the time-dependent steering control amount on the steering torque to be applied, which increases as the time period over which actual moving state deviates from the target moving state in the past increases and as the time elapses, is reduced when the driver makes the predetermined driving operation. Thus, it is possible to avoid the problem where steering feel degrades because the steering torque increases over time.

In the above first aspect, the control module may reduce the time-dependent steering control amount when the predetermined driving operation by the driver is detected.

This reduces the time-dependent steering control when the predetermined driving operation by the driver is detected by the driving operation detection module. Thus, according to the above configuration, the influence of the time-dependent steering control amount on the steering torque to be applied is decreased by reducing the time-dependent steering control when the driver makes the predetermined driving operation, even if the time elapses to increase the time-dependent steering control amount. Thus, it is possible to avoid the problem that the steering torque increases over time, which degrades the steering feel.

In this case, the control module may reset the time-dependent steering control amount to zero when the predetermined driving operation by the driver is detected.

This resets the time-dependent steering control amount when the predetermined driving operation by the driver is detected by the driving operation detection module. Thus, according to the above configuration, the time-dependent steering control amount is reset to zero when the driver makes the predetermined driving operation, even if time elapses to increase the time-dependent steering control amount. Therefore, the steering torque to be applied is not affected by the time-dependent steering control amount. Thus, it is possible to avoid the problem that the steering torque increases over time to degrade the steering feel.

In addition, in the above first aspect, the control module may reduce the influence of the time-dependent steering control amount on the steering torque to be applied by applying a gain to the time-dependent steering control amount.

The gain to the time-dependent steering control amount is applied when the predetermined driving operation by the driver is detected by the driving operation detection module, so that the steering torque application module applies a steering torque in such a way that the influence of the time-dependent steering control amount on the steering torque to be applied is reduced. Thus, it is possible to avoid the problem that the steering torque increases over time to degrade the steering feel, even if the time-dependent steering control amount increases over time.

In the above first aspect, the predetermined driving operation may be a driving operation that causes the target moving state and the actual moving state to deviate from each other.

This decreases the time-dependent steering control amount acquired by the time-dependent steering control amount acquisition module when a driving operation that will cause the target moving state and the actual moving state to deviate from each other (for example, that will cause the vehicle to travel off the target lane) is detected. Thus, according to the above configuration, the acquired time-dependent steering control amount is reduced and a steering torque is applied based on the reduced time-dependent steering control amount, even if the driver makes a driving operation to cause the target moving state and the actual moving state to deviate from each other and the cumulative time-dependent steering control amount increases. Thus, it is possible to avoid the problem that the cumulative steering torque increases, which degrades the steering feel over time, due to the influence of the time-dependent steering control amount.

In addition, in the above first aspect, the control module may continuously reduce the influence of the time-dependent steering control amount on the steering torque to be applied for a period of time: because the influence of the time-dependent steering control amount on the steering torque to be applied decreases until a differential between a target lateral position of the vehicle and an actual lateral position of the vehicle falls below a predetermined threshold. The target lateral position serves as an indicator of the target moving condition and the actual lateral position serves as an indicator of the actual moving condition.

This causes the state where the influence of the time-dependent steering control amount on the steering torque acquired by the time-dependent steering control amount acquisition module is reduced to be initiated when the driving operation detection module detects the predetermined driving operation by the driver, and to be terminated when the differential between the target lateral position and the actual lateral position of the vehicle falls below the predetermined threshold. Thus, according to the above configuration, the influence of the acquired time-dependent steering control amount on the steering torque is decreased from when the predetermined driving operation is made and continued by the driver until the differential between the target lateral position and the actual lateral position of the vehicle falls below the predetermined threshold. Therefore, it is possible to prevent the steering torque application module from applying a steering torque in the direction opposite the driving operation by the driver, thereby avoiding degradation of the steering feel. When the differential between the target lateral position and the actual lateral position of the vehicle falls below the predetermined threshold, a steering torque reflecting the time-dependent steering control amount acquired by the time-dependent steering control amount acquisition module is calculated and applied to the vehicle as normally, thereby allowing the vehicle to travel while maintaining the target moving state.

In addition, the above first aspect may further include: an offset amount acquisition module that acquires an offset amount of the vehicle from the target moving state; and an integral acquisition module that acquires an integral of the offset amount with respect to time, as the time-dependent steering amount acquisition module.

This allows the offset amount acquisition module to acquire the offset amount of the vehicle from the target moving state, and allows the integral acquisition module to acquire an integral of the offset amount with respect to time. At this time, the steering torque application module applies a steering torque to the vehicle in such a way that the influence of the integral on the steering torque is reduced when the predetermined driving operation by the driver is detected. Since the integral becomes larger as the time elapses, it is possible to avoid the problem that the steering torque increases over time, which degrades the steering feel by restricting the influence of the integral on the steering torque.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Figure 1:
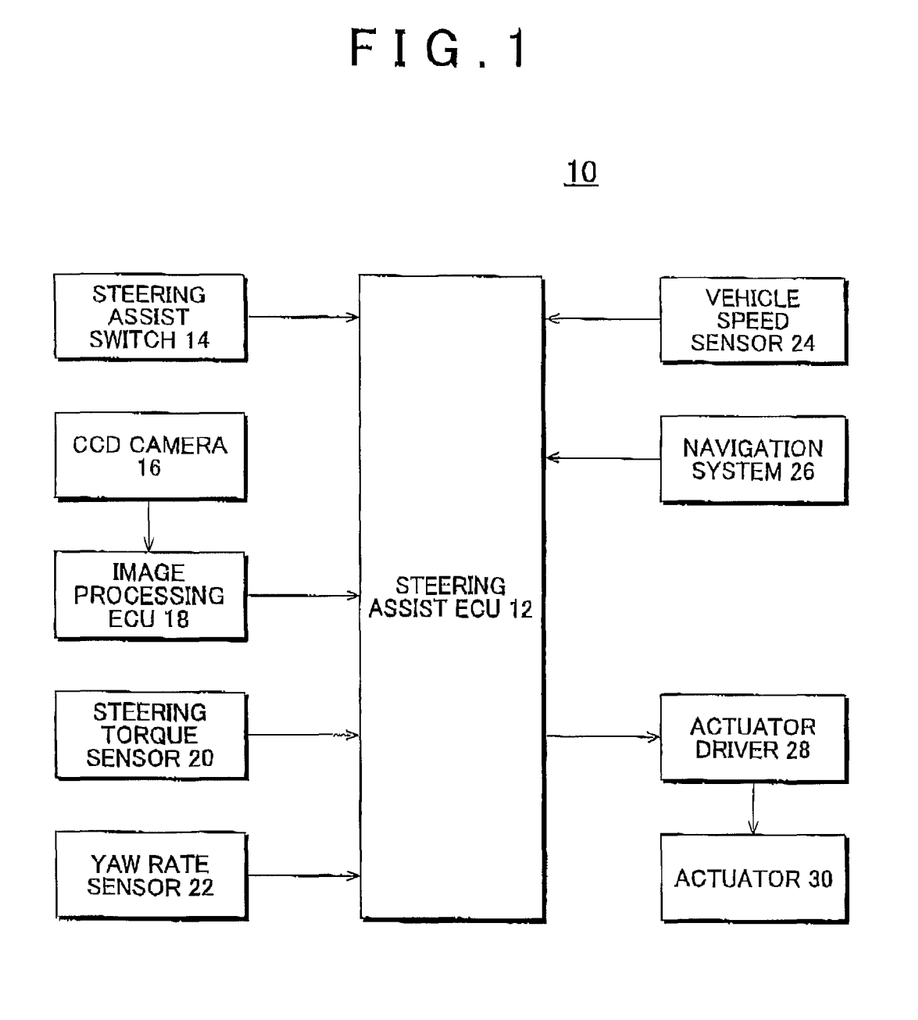
FIG. 1 is a schematic diagram of a steering assist system 10 in accordance with an embodiment of the present invention.

An embodiment of the steering assist system of the present invention with reference to the drawings is described below. FIG. 1 shows a schematic configuration of a steering assist system 10 in accordance with the embodiment of the present invention.

The steering assist system 10 is mounted on a vehicle (for example, such as an automobile). The steering assist system 10 includes a steering assist electronic control unit (hereinafter referred to as "steering assist ECU") 12, a steering assist switch 14, a CCD camera 16, an image processing electronic control unit (hereinafter referred to as "image processing ECU") 18, a steering torque sensor 20, a yaw rate sensor 22, a vehicle speed sensor 24, a navigation system 26, an actuator driver 28, and an actuator 30.

The steering assist ECU 12 is a microcomputer having a general configuration with an interface including a CPU for controlling respective devices, processing and calculating various data, a ROM for storing a program to be executed by the CPU, and a map (lookup table), a RAM for the CPU to temporarily store data as necessary, a backup RAM for maintaining data while the power is turned on and keeping the stored data while the power is turned off, and an AD converter. The steering assist ECU 12 provides steering assist to the driver as necessary.

The steering assist switch 14 is mounted in the vicinity of a driver's seat in the vehicle, and sends the content of an operation to the steering assist ECU 12 when operated by the driver. Specifically, the steering assist system 10 executes a steering assist control when the steering assist switch 14 is turned "ON", and does not execute steering assist control when the steering assist switch 14 is turned "OFF".

The CCD camera 16 is mounted in the front of the vehicle. The CCD camera 16 captures the image of a roadway ahead of the vehicle and sends the acquired image to the image processing ECU 18. The image processing ECU 18 is a microcomputer having a general configuration similar to that of the steering assist ECU 12. The image processing ECU 18 processes the image captured by the CCD camera 16, and sends the processing results to the steering assist ECU 12. Specifically, the image processing ECU 18 recognizes a lane for the vehicle from the acquired image based on a white line or the like of the roadway on which the vehicle is traveling, and to acquire the position of the vehicle in the lane, the curvature, the yaw angle, and the offset amount in a known manner.

The steering torque sensor 20 is installed in the vicinity of a steering shaft (not shown) of the vehicle, and detects the steering torque and the steering angle applied to a steering wheel (not shown) of the vehicle by the driver, and sends the detection results to the steering assist ECU 12. The yaw rate sensor 22 is mounted below a center console (not shown) of the vehicle, and detects the yaw rate of the vehicle and sends the detection results to the steering assist ECU 12. The vehicle speed sensor 24 includes a wheel speed sensor mounted at each wheel (not shown) of the vehicle, and detects the speed of the vehicle or whether the vehicle is at a stop, and sends the detection results to the steering assist ECU 12.

The navigation system 26 detects the position of the vehicle utilizing GPS or the like. The navigation system 26 also detects the curvature, the inclination, etc., of the roadway for the vehicle. The information detected by the navigation system 26 is sent to the steering assist ECU 12.

The actuator driver 28 is connected to the steering assist ECU 12, and supplies the actuator 30 with a driving current in response to a command from the steering assist ECU 12. The actuator 30 is disposed in a steering gear box (not shown) of the vehicle. A ball nut is fixed to a rotor of the actuator 30. The ball nut has in its inner peripheral surface a ball screw groove corresponding to a ball screw groove formed in a part of the outer peripheral surface of a rack bar (not shown) of the vehicle. A plurality of bearing balls are provided between the pair of ball screw grooves. Thus, when the actuator 30 is actuated, the rotor rotates to move the rack bar axially to assist steering.

The actuator 30 applies a steering torque in accordance with a driving signal fed from the actuator driver 28, to the rack bar. The steering assist ECU 12 feeds a command to the actuator driver 28 according to the logics to be discussed later, in order to drive the actuator 30 to displace the rack bar and steer the wheels (not shown) of the vehicle.

Now, the operation of the steering assist system 10 in accordance with this embodiment described above will be summarized. In the steering assist system 10 in accordance with this embodiment, a steering assist torque T that is applied to the vehicle in order to allow travel along the roadway is obtained by multiplying a target lateral acceleration TG by a predetermined coefficient Kg. The target lateral acceleration TG is calculated by the equation (1) below:

$$TG = Gid + Gd + G\theta + Gf \qquad (1)$$

A target lateral acceleration Gid is calculated based on an integral id of a lane offset d. The steering assist ECU 12 sets Gid to correct the lane offset or deviation of the vehicle due to the incline of the roadway. On an inclined roadway, the acceleration due to the steering torque and the gravitational acceleration due to the incline are balanced at a position offset from the center line of the roadway by an amount corresponding to the incline. At this time, it is possible to correct the lane offset or deviation due to incline by calculating the steering torque based on the integral of the offset amount.

A target lateral acceleration Gd is calculated based on the lane offset d. When there is a lane offset d from the center line of the roadway, the steering assist ECU 12 sets Gd to allow the vehicle to travel along the center line of the roadway. A target lateral acceleration $G\theta$ is calculated based on the yaw angle $\theta$, which is equivalent to the angle between the center line of the vehicle in the longitudinal direction and a line tangent to the center line of the roadway at the center of gravity of the vehicle. The steering assist ECU 12 sets $G\theta$ to allow the vehicle to travel along the center line of the roadway. A target lateral acceleration Gf is calculated based on a curvature x of the roadway ahead of the vehicle and a vehicle speed v. The steering assist ECU 12 sets Gf to allow the vehicle to travel along the shape of a curve of the roadway.

Figure 2:
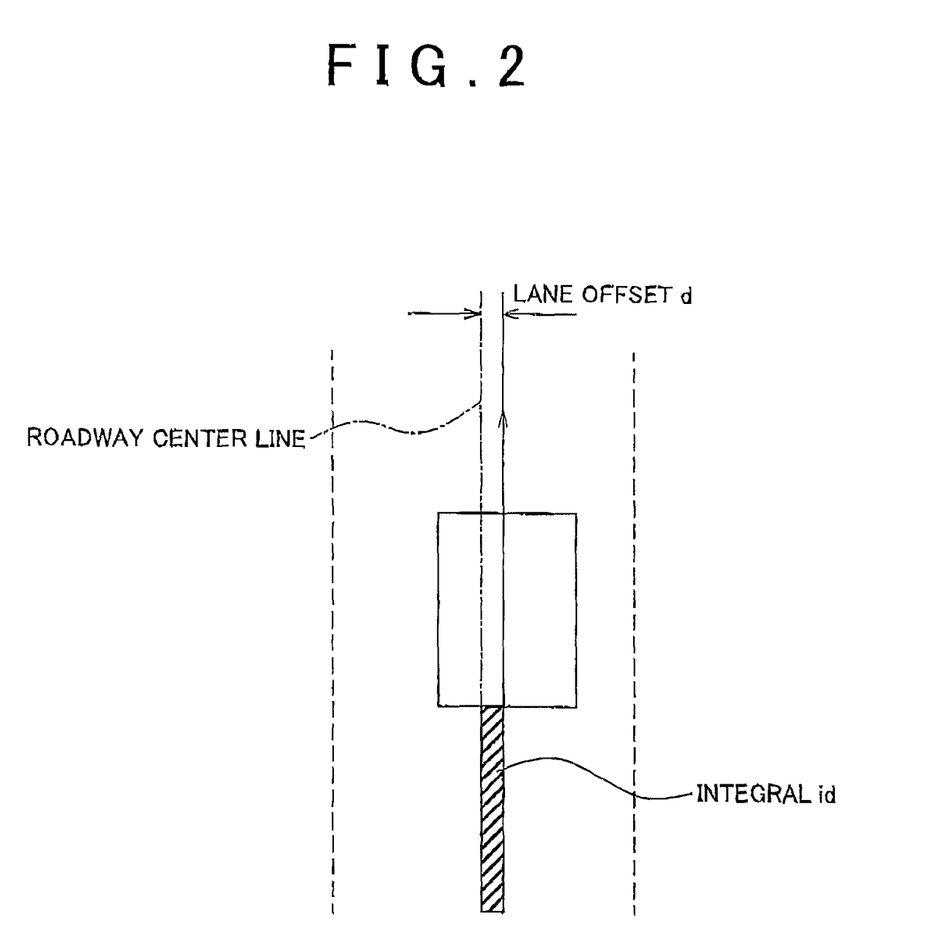
FIG. 2 shows the state where the driver is driving intentionally off the center line.
Figure 3:
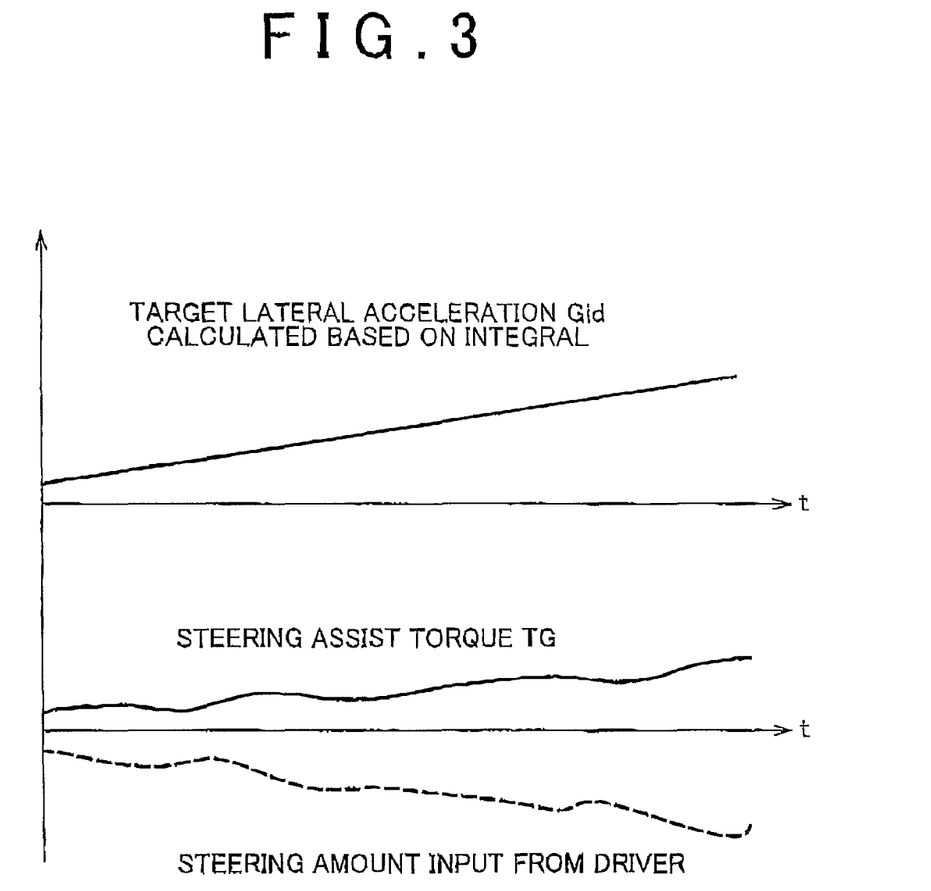
FIG. 3 is a graph showing the relation among the steering amount input from the driver, the steering torque T, and the target acceleration Gid calculated based on an integral in a conventional steering assist system (in the case where the integral is not reset)

It is determined that the driver is intentionally making an operation to offset the vehicle to the right of the center line of the roadway by the lane offset d with the steering assist turned ON, as shown in FIG. 2. At this time, in a conventional steering assist system, the integral id of the lane offset d increases as the time elapses, and thus Gid, and hence the target lateral acceleration TG, increase. As a result, in the conventional steering assist system, the cumulative steering torque T generated by the conventional steering assist system increases over time, as shown in the graph of FIG. 3. Therefore, it is necessary for the driver to steer with a greater force in order to maintain an intentional offset moving state, which degrades the steering feel.

Figure 4:
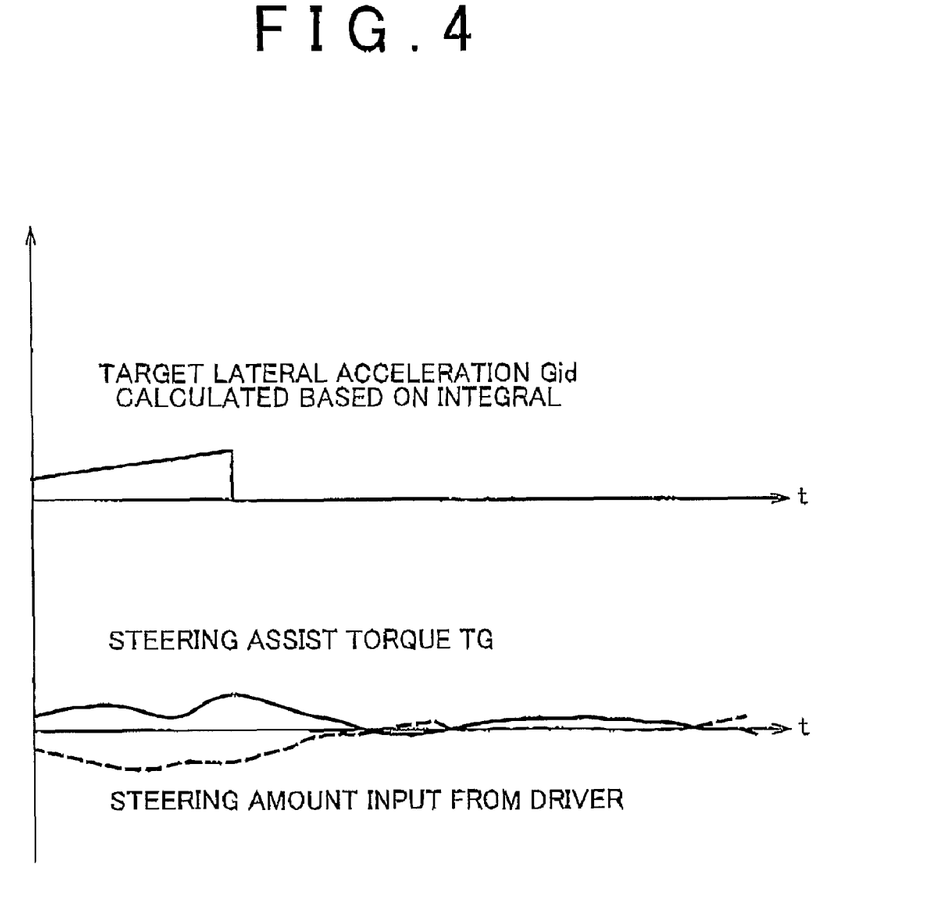
FIG. 4 is a graph showing the relation among the steering amount input from the driver, the steering torque T, and the target acceleration Gid calculated based on an integral in the steering assist system 10 in accordance with the embodiment of the present invention (in the case where the integral is reset)

In contrast, the steering assist system 10 in accordance with this embodiment determines whether the driver is intentionally making an operation to offset the vehicle from the center line of the roadway, and resets the integral id to zero when it is determined that the driver is intentionally making an operation to offset the vehicle from the center line of the roadway. This also makes Gid zero, as shown in the graph of FIG. 4, thereby preventing the cumulative target lateral acceleration TG from increasing. In the description below, the term "reset" means "reset to zero".

Now, the reason that only the integral id is reset when it is determined that the driver is intentionally making an operation to offset the vehicle from the center line of the roadway will be explained. The integral id is calculated by integrating the lane offset d at periods of $\Delta T$. Thus, increases in the integral id accumulate over time even if the lane offset d is small. In addition, because increases in Gid accumulate, even if the driver intentionally cancels the operation to offset the vehicle from the center line of the roadway so that Gid will not be reset, Gid will not increase to make the driver feel uncomfortable.

In contrast, if the lane offset d or the yaw angle $\theta$ is reset or the influence of either is decreased when it is determined that the driver is intentionally making an operation to offset the vehicle from the center line of the roadway, the target lateral acceleration TG may abruptly increase when the driver cancels such an operation to cause hunting. This is because the cumulative lane offset d and the yaw angle $\theta$ do not increase.

Also, if the curvature x and the vehicle speed v are reset or the influence of either is decreased when it is determined that the driver is intentionally making an operation to offset the vehicle from the center line of the roadway, appropriate steering assist may not be provided when the vehicle goes into a corner. This is because Gf, which is calculated based on the curvature x and the vehicle speed v, is a target lateral acceleration that allows travel along the shape of a curve. Keeping the steering assist turned ON suggests that the steering assist is expected at a curve, even if the driver is intentionally driving off the center line of the roadway. Therefore, the curvature x and the vehicle speed v also need to be considered when it is determined that the driver is intentionally making an operation to offset the vehicle from the center line of the roadway.

Also, if the target lateral acceleration TG and the steering assist torque T are reset or reduced when it is determined that the driver is intentionally making an operation to offset the vehicle from the center line of the roadway, the influence of Gf, which is calculated based on the curvature x and the vehicle speed v, may also be reduced, and thus appropriate steering assist may not be provided when the vehicle goes into a corner. For these reasons, it is preferable that only the integral id is reset when it is determined that the driver is intentionally making an operation to offset the vehicle from the center line of the roadway.

The steering assist system 10 in accordance with this embodiment determines whether the driver is intentionally making an operation to offset the vehicle from the center line of the roadway based on whether the following six conditions are satisfied:

Condition 1: the driver is making a steering operation,
Condition 2: the steering assist torque T is sufficiently large,
Condition 3: the steering assist torque T is in the direction opposite the steering operation by the driver,
Condition 4: Gid is sufficiently large,
Condition 5: Gid and the steering assist torque T are in the same direction, and
Condition 6: the lane offset d is smaller than a threshold d2.

Condition 1 is provided because without a steering operation by the driver, the driver could not be operating intentionally. A steering operation by the driver is detected by the steering torque sensor 20. Condition 2 is provided because the steering assist torque T so small would not affect the operation by the driver. Condition 3 is provided because a steering operation by the driver in the same direction as the steering assist torque to bring the vehicle back on the center line of the roadway could indicate that the offset driving is not intentional and that would not degrade the steering feel for the driver. Conditions 4 and 5 are provided to determine whether or not the steering assist torque T is greatly affected by the integral id. Condition 6 is provided because the steering assist should be provided to cause the vehicle to travel along the roadway when the lane offset d is sufficiently large.

Once the integral id is reset, the steering assist system 10 in accordance with this embodiment does not calculate the integral id before the lane offset d exceeds a predetermined threshold d1. This is because if integration of the lane offset starts again immediately after the integral id is reset, the driver would feel the steering assist torque T again even though the steering assist torque is not necessary. While the intentional offset movement due to a driving operation by the driver continues, the steering assist system 10 in accordance with this embodiment continuously resets the integral id, thereby avoiding the problem that the steering feel degrades as long as such intentional offset driving is maintained.

Now, the actual operation of the steering assist system 10 in accordance with this embodiment will be described. In the description of this embodiment below, a plus sign and a negative sign attached to a parameter with a directional property represent right and left, respectively. The steering assist ECU 12 of the steering assist system 10 in accordance with this embodiment executes a routine for assisting in traveling along a roadway (steering assist routine) shown in the flowchart of FIG. 5 at predetermined time intervals while the steering assist switch 14 is turned "ON".

Figure 5:
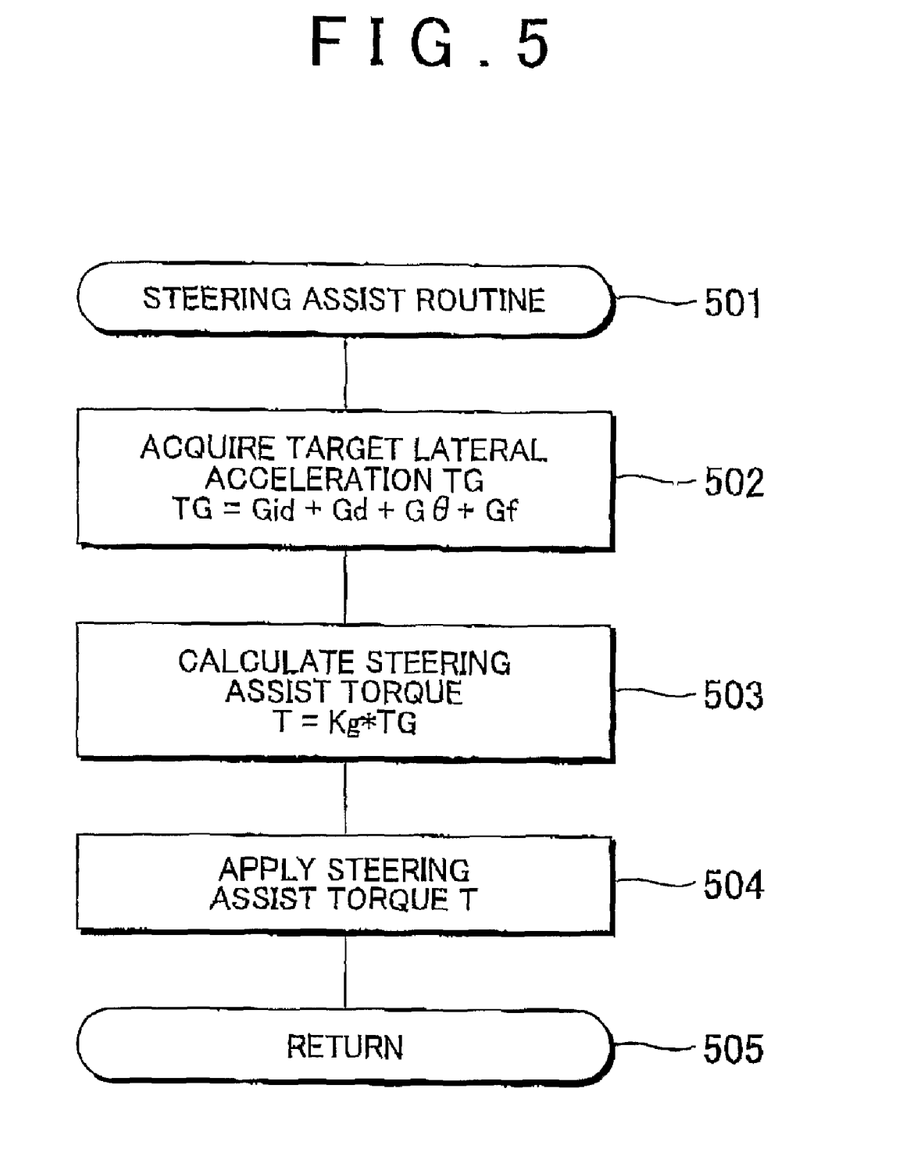
FIG. 5 is a flowchart showing a routine executed by a CPU of a steering assist electronic control unit 12 of the steering assist system 10 in accordance with the embodiment of the present invention.

The steering assist ECU 12 of the steering assist system 10 in accordance with this embodiment starts the process in step 501 of the steering assist routine at a predetermined time, and proceeds to step 502 to calculate the target lateral acceleration TG. Specifically, the target lateral acceleration TG is calculated by adding the target lateral acceleration Gid based on the integral id, the target lateral acceleration Gd based on the lane offset d, the target lateral acceleration Gθ based on the yaw angle θ, and the target lateral acceleration Gf based on the curvature x and the vehicle speed v. Gid is calculated by the method explained with reference to the flowchart shown in FIG. 6, discussed later. Gd, Gθ and Gf may be calculated using the known method. The parameters necessary for this calculation, namely the yaw rate y and the vehicle speed v, are appropriately acquired by the yaw rate sensor 22 and the vehicle speed sensor 24, respectively. The lane offset d and the curvature x are appropriately acquired by processing via the image processing ECU 18 image data on the roadway taken by the CCD camera 16. The curvature x may be acquired utilizing map data stored in the navigation system 26 in advance.

Then, the steering assist ECU 12 proceeds to step 503 to calculate the steering assist torque T by multiplying the target lateral acceleration TG by the predetermined coefficient Kg. Then, the steering assist ECU 12 proceeds to step 504 to feed a command for the actuator driver 28 to apply the steering assist torque T, in order to drive the actuator 30 so as to generate and apply a steering torque to the vehicle. Then, the steering assist ECU 12 proceeds to step 505 to temporarily terminate the routine.

Subsequently, an integral target lateral acceleration Gid calculation routine for calculating an integral target lateral acceleration Gid will be described. The steering assist ECU 12 of the steering assist system 10 in accordance with this embodiment executes the integral target lateral acceleration Gid calculation routine shown in the flowchart of FIG. 6 at intervals of a predetermined time.

Figure 6:
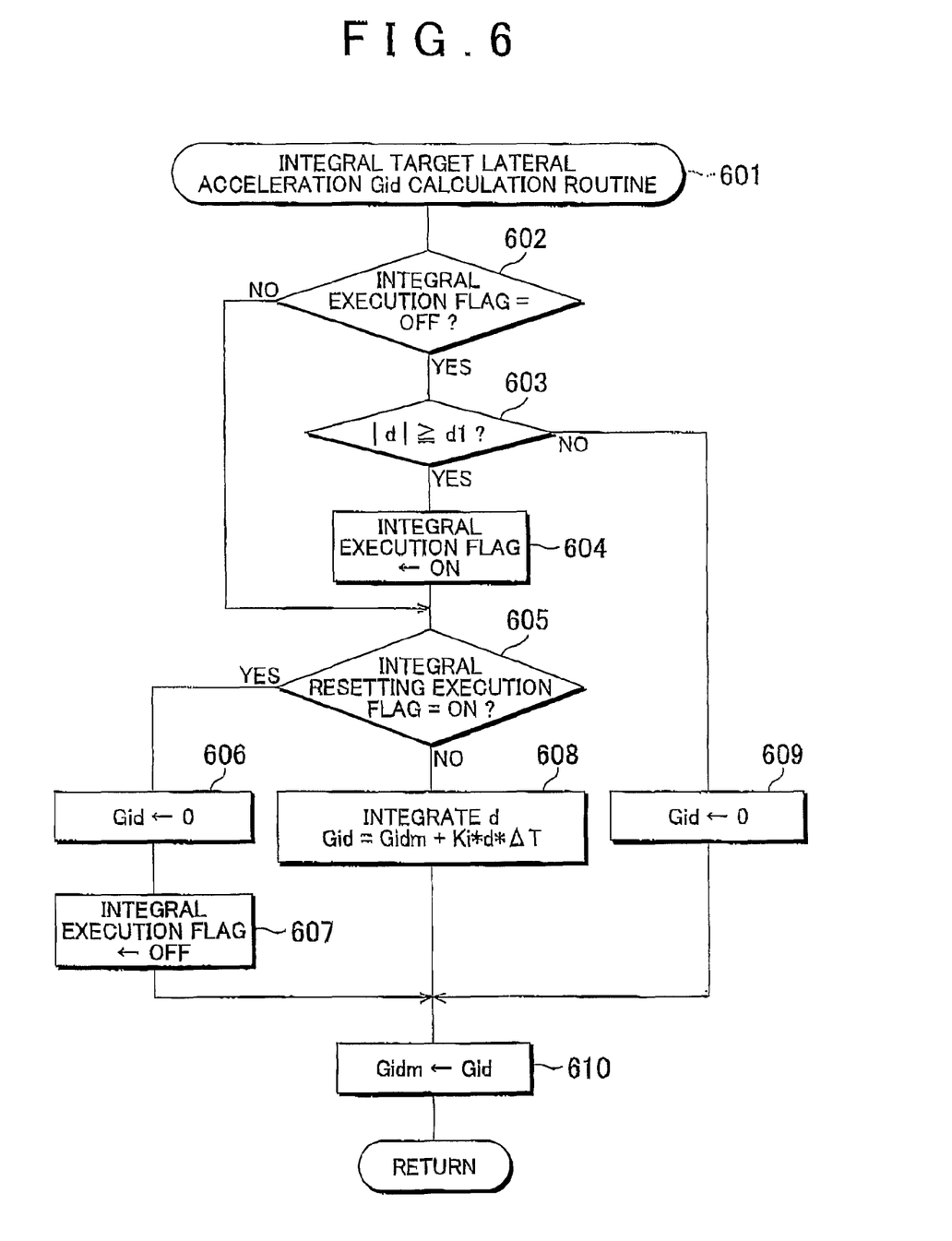
FIG. 6 is a flowchart showing a routine executed by the CPU of the steering assist electronic control unit 12 of the steering assist system 10 in accordance with the embodiment of the present invention.

The steering assist ECU 12 of the steering assist system 10 in accordance with this embodiment starts the process in step 601 of the integral target G calculation routine at a predetermined time, and proceeds to step 602 to determine whether the lane offset integral execution flag is "OFF". If "Yes" in step 602, that is, if the lane offset integral execution flag is "OFF" (integration is determined to be not performed), the steering assist ECU 12 proceeds to step 603 to determine the absolute value of the lane offset d. On the other hand, if "No" in step 602, that is, if the lane offset integral execution flag is "ON" (integration is determined to be performed), the steering assist ECU 12 proceeds to step 605 determine the integral resetting execution flag.

In step 603, the steering assist ECU 12 determines whether the absolute value of the lane offset d is equal to or more than the threshold d1, which is a criterion for determining whether the vehicle is traveling in the vicinity of the center line of the roadway. If "Yes" in step 603, that is, if the absolute value of the lane offset d is equal to or more than the threshold d1, it is necessary to apply a torque so that the vehicle will travel along the center line of the roadway. Thus, the steering assist ECU 12 proceeds to step 604 to turn "ON" the lane offset integral execution flag, and proceeds to step 605 to determine the integral resetting execution flag.

On the other hand, if "No" in step 603, that is, if the absolute value of the lane offset d is less than the threshold d1, it is not necessary to apply a torque. Thus, the steering assist ECU 12 proceeds to step 609 to substitute zero for Gid which is the target lateral acceleration based on the integral id, proceeds to step 610 to substitute Gid for Gidm, which is the target lateral acceleration based on the integral id in the preceding process, and proceeds to step 611 to temporarily terminate the routine.

In step 605, the steering assist ECU 12 determines whether the integral resetting execution flag is "ON". If "Yes" in step 605, that is, if the integral resetting execution flag is "ON", the steering assist ECU 12 proceeds to step 606 to reset the integral by substituting zero for Gid, and proceeds to step 607. In step 607, the steering assist ECU 12 turns "OFF" the lane offset integral execution flag to continuously reset until the absolute value of the lane offset d exceeds the threshold d1 again, and proceeds to step 610. In step 610, the steering assist ECU 12 substitutes Gid for Gidm, and proceeds to step 611 to temporarily terminate the routine.

On the other hand, if "No" in step 605, that is, if the integral resetting execution flag is "OFF", the steering assist ECU 12 proceeds to step 608 to integrate the lane offset d. Specifically, the calculation is performed by the equation (2) given below:

$$Gid = Gidm + Ki*d*\Delta T \quad (2)$$

Ki is a predetermined coefficient for integration, and $\Delta T$ is a period for integration calculations. Then, the steering assist ECU 12 proceeds to step 610 to substitute Gid for Gidm, and proceeds to step 611 to temporarily terminate the routine.

Subsequently, an integral resetting determination routine for determining whether or not the integral id is to be reset will be described. The steering assist ECU 12 of the steering assist system 10 in accordance with this embodiment executes the integral resetting determination routine shown in the flowchart of FIG. 7 at intervals of a predetermined time. This routine is configured to determine that the integral should be reset when the driver has intentionally continued an operation to offset the vehicle from the center line of the roadway for at least a threshold Tr1.

Figure 7:
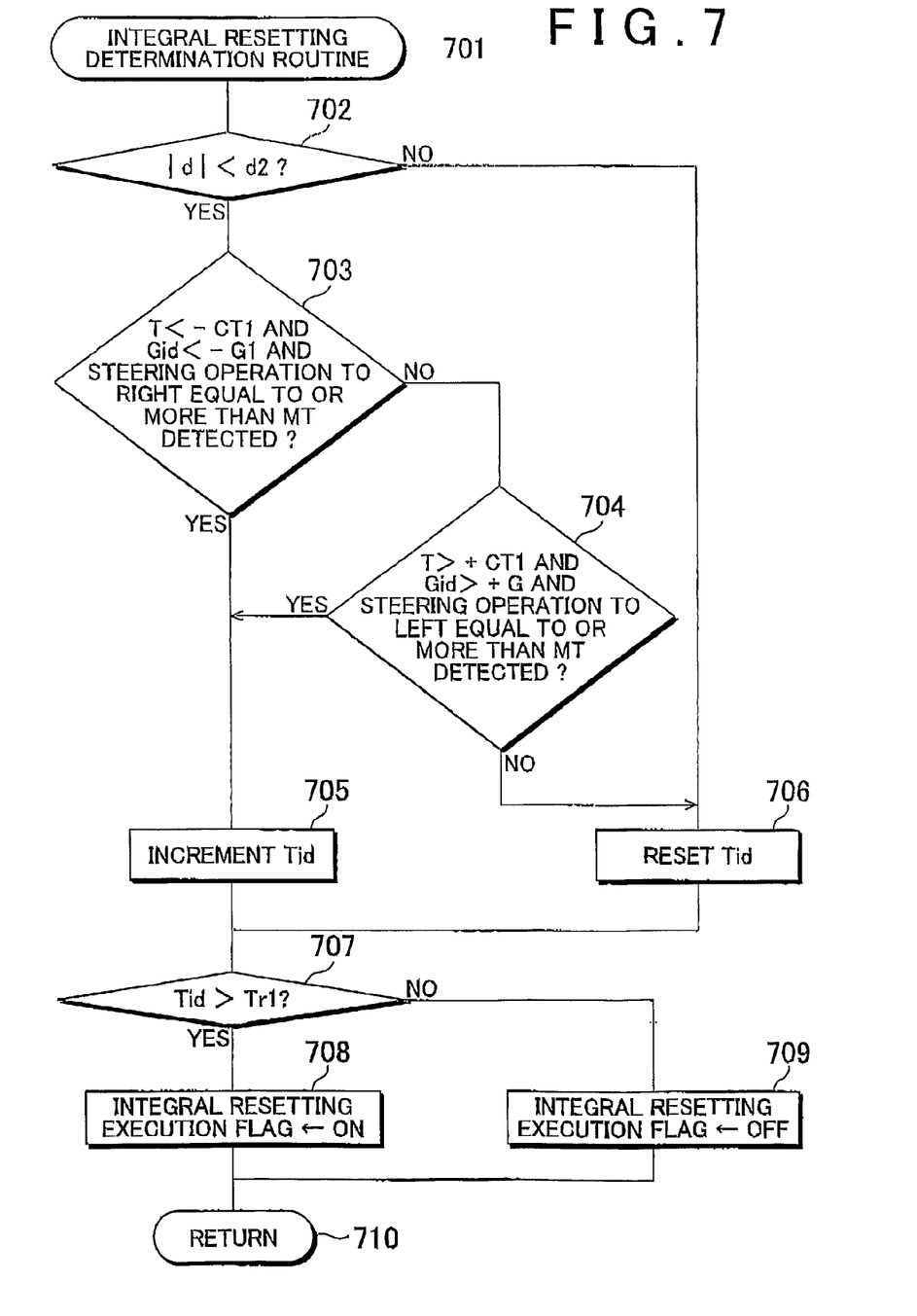
FIG. 7 is a flowchart showing a routine executed by the CPU of the steering assist electronic control unit 12 of the steering assist system 10 in accordance with the embodiment of the present invention.

The steering assist ECU 12 of the steering assist system 10 in accordance with this embodiment starts the process in step 701 of the integral resetting determination routine at a predetermined timing, and proceeds to step 702 to determine whether or not the lane offset d is less than a threshold d2, which is a criterion for determining whether the vehicle is traveling in the vicinity of the center line of the roadway. If "Yes" in step 702, that is, if the absolute value of the lane offset d is less than the threshold d2, the steering assist ECU 12 proceeds to step 703 to determine whether the driver is intentionally making an operation to offset the vehicle to the right from the center line of the roadway.

In order to determine that the driver is making an operation to offset the vehicle to the right from the center line of the roadway, the following needs to be detected: a steering operation to the right by the driver; a steering assist torque T to the left of a predetermined magnitude or more; and Gid which is a target lateral acceleration based on the integral, to the left of a predetermined magnitude or more. Thus, the steering assist ECU 12 determines "Yes" in step 703 when the steering torque sensor 20 detects a steering torque to the right with an absolute value equal to or more than a threshold MT, the magnitude of the steering assist torque T is equal to or less than a threshold −CT1, and the magnitude of Gid is equal to or less than a threshold −G1, and proceeds to step 705.

On the other hand, if "No" in step 703, that is, if it is determined that the driver is not making an intentional operation to offset the vehicle to the right from the center line of the roadway, the steering assist ECU 12 proceeds to step 704 to determine whether the driver is intentionally making an operation to offset the vehicle to the left from the center line of the roadway, as in step 703. Thus, the steering assist ECU 12 determines "Yes" in step 704 when the steering torque sensor 20 detects a steering torque to the left with an absolute value equal to or more than the threshold MT, the magnitude of the steering assist torque T is equal to or more than a threshold CT1, and the magnitude of Gid is equal to or more than a threshold G1, and proceeds to step 705.

In step 705, the steering assist ECU 12 increases by one, an integral resetting determination timer Tid, and proceeds to step 707 to determine whether the integral should be reset. Specifically, the integral resetting determination timer Tid and the threshold Tr1 for resetting the integral are compared to determine that the integral should be reset if the integral resetting determination timer Tid is larger, and to determine that the integral should not be reset if not.

If "Yes" in step 707, that is, if it is determined that the integral should be reset, the steering assist ECU 12 proceeds to step 708 to turn "ON" the integral resetting execution flag, and proceeds to step 710 to temporarily terminate the routine. On the other hand, if "No" in step 707, that is, if it is determined that the integral should not be reset, the steering assist ECU 12 proceeds to step 709 to turn "OFF" the integral resetting execution flag, and proceeds to step 710 to temporarily terminate the routine.

If "No" is determined in step 702 and if "No" is determined in step 704, that is, if it is determined that the driver is not intentionally making an operation to offset the vehicle from the center line of the roadway, the steering assist ECU 12 proceeds to step 706 to reset the integral resetting determination timer Tid to zero, and proceeds to step 707. At this time, the integral resetting determination timer Tid is zero and hence less than the threshold Tr1, the steering assist ECU 12 proceeds to step 709 to turn "OFF" the integral resetting execution flag, and proceeds to step 710 to temporarily terminate the routine.

As has been described above, the steering assist system 10 in accordance with the embodiment of the present invention determines whether the driver is intentionally making an operation to offset the vehicle from the center line of the roadway based on the magnitude and the direction of various parameters indicating a steering operation by the driver, a target torque, a target lateral acceleration based on an integral, and a lane offset. In this way, it is possible to avoid the problem that the cumulative steering torque increases due to the influence of the integral, which degrades the steering feel over time, by resetting the integral when it is determined that the driver is intentionally making an operation to offset the vehicle from the center line of the roadway.

The present invention is not limited to the above embodiment, and may be modified in various ways that fall within the scope of the present invention such as stated below.

For example, although the steering assist system 10 in accordance with the above embodiment determines whether the driver is intentionally making an operation to offset the vehicle from the center line of the roadway based on six conditions, it is not necessary to require satisfaction of all six conditions. For example, three conditions arbitrarily chosen out of the six may be used. Alternatively, other conditions may be added thereto.

In the steering assist system 10 in accordance with the above embodiment, the integral is reset to restrict the influence of the integral id on the steering assist torque T. However, a gain less than 1 may be applied to the integral to restrict the influence of the integral.

In the steering assist system 10 in accordance with the above embodiment, the influence of the integral id on the steering assist torque T is restricted. However, the present invention is not limited thereto, and may be effectively applied to such a parameter that increases the steering assist torque to be applied the longer the period of time that the actual moving state of the vehicle deviates from the target moving state. It is assumed that there is provided a steering assist system that acquires a deviation time dt, for which the target moving state and the actual moving state of the vehicle deviate from each other, and that increases the steering assist torque when the deviation time dt is longer, than when it is shorter. In such a steering assist system, the deviation time dt may be reset or a gain may be applied thereto to reduce the steering assist torque when a particular operation by the driver is detected.

Further, the steering assist system 10 in accordance with the above embodiment determines the steering assist torque T and Gid, which is a target lateral acceleration based on an integral, as the steering control amount. However, the steering control amount in the present invention may be any that can restrict the influence of a time-dependent parameter such as an integral on the steering operation torque that is actually applied to the vehicle. For example, a command current value for actually applying a steering torque to the vehicle may be acquired directly from various parameters using a map or the like.

The invention claimed is:

1. A steering assist system comprising:
   a roadway acquisition module that acquires a shape of a roadway on which a vehicle is moving;
   a target moving state determining module that determines a target moving state for the vehicle based on the shape of the roadway;
   an actual moving state acquisition module that acquires an actual moving state of the vehicle;
   a time-dependent steering control amount acquisition module that acquires a time-dependent steering control amount, the time-dependent steering control amount being a steering control amount based on which a steering torque to be applied to the vehicle is determined and which depends on time, and the time-dependent steering control amount increases as a time period over which the actual moving state deviates from the target moving state increases, in order to reduce the deviation between the actual moving state and the target moving state;
   a time-independent steering control amount acquisition module that acquires a time-independent steering control amount, the time-independent steering control amount being a steering control amount based on which a steering torque to be applied to the vehicle is determined and which does not depend on time, in order to reduce the deviation between the actual moving state and the target moving state;
   a steering torque application module that applies a steering torque based on the time-dependent steering control amount and the time-independent steering control amount;
   a driving operation detection module that detects a predetermined driving operation by a driver; and
   a control module that reduces an influence of the time-dependent steering control amount on the steering torque to be applied when the predetermined driving operation by the driver is detected, while maintaining an influence of the time-independent steering control amount on the steering torque.

2. The steering assist system according to claim 1, wherein: the control module decreases the time-dependent steering control amount when the predetermined driving operation by the driver is detected.

3. The steering assist system according to claim 2, wherein: the control module resets the time-dependent steering amount to zero when the predetermined driving operation by the driver is detected.

4. The steering assist system according to claim 1, wherein: the control module reduces the influence of the time-dependent steering amount on the steering torque to be applied by applying a gain to the time-dependent steering amount, before applying the steering torque.

5. The steering assist system according to claim 1, wherein: the predetermined driving operation is a driving operation that causes the actual moving state to deviate from the target moving state.

6. The steering assist system according to claim 5, wherein: the control module reduces the influence of the time-dependent steering amount when the driving operation that causes the actual moving state to deviate from the target moving state detected by the driving operation detection module continues for at least a predetermined time.

7. The steering assist system according to claim 1, wherein: the control module reduces the influence of the time-dependent steering control amount on the steering torque to be applied for a continuous period of time that starts when the predetermined driving operation is detected and lasts until a differential between a target lateral position, which indicates the target moving state of the vehicle, and an actual lateral position, which indicates the actual moving state of the vehicle, falls below a predetermined threshold.

8. The steering assist system according to claim 1, further comprising:
   an offset amount acquisition module that calculates an offset amount of the vehicle from the target moving state; and
   an integral acquisition module that calculates an integral of the offset amount with respect to time, as the time-dependent steering control amount.

9. The steering assist system according to claim 1, wherein: the time-independent steering control amount is acquired based on at least one of a lane offset from a center line of the roadway, a yaw angle, a curvature of the roadway, and a vehicle speed.

10. A steering assist method comprising:
    acquiring a shape of a roadway on which a vehicle is moving;
    acquiring a target moving state for the vehicle based on the shape of the roadway;
    determining an actual moving state of the vehicle;
    acquiring a time-dependent steering control amount, the time-dependent steering control amount being a steering control amount based on which a steering torque to be applied to the vehicle is determined and which depends on time, and the time-dependent steering control amount increases as a time period over which the actual moving state deviates from the target moving state increases, in order to reduce the deviation between the actual moving state and the target moving state;
    acquiring a time-independent steering control amount, the time-independent steering control amount being a steering control amount based on which a steering torque to be applied to the vehicle is determined and which does not depend on time, in order to reduce the deviation between the actual moving state and the target moving state;

applying a steering torque based on the time-dependent steering control amount and the time-independent steering control amount;

detecting a predetermined driving operation by a driver; and reducing an influence of the time-dependent steering control amount on the steering torque to be applied when the predetermined driving operation by the driver is detected, while maintaining an influence of the time-independent steering control amount on the steering torque.

11. The steering assist method according to claim 10, wherein:
the influence of the time-dependent steering control amount on the steering torque is reduced by decreasing the time-dependent steering control amount.

12. The steering assist method according to claim 11, wherein:
the influence of the time-dependent steering control amount on the steering torque is reduced by resetting the time-dependent steering control amount to zero.

13. The steering assist method according to claim 10, wherein:
the influence of the time-dependent steering control amount on the steering torque is reduced by applying a gain to the time-dependent steering control amount.

14. The steering assist method according to claim 10, wherein:
the time-independent steering control amount is acquired based on at least one of a lane offset from a center line of the roadway, a yaw angle, a curvature of the roadway, and a vehicle speed.

15. A steering assist system comprising:
a roadway acquisition module that acquires a shape of a roadway on which a vehicle is moving;

a target moving state determining module that determines a target moving state for the vehicle based on the shape of the roadway;

an actual moving state acquisition module that acquires an actual moving state of the vehicle;

a time-dependent steering control amount acquisition module that acquires a time-dependent steering control amount, the time-dependent steering control amount being a steering control amount based on which a steering torque to be applied to the vehicle is determined and which depends on time, and the time-dependent steering control amount increases as a time period over which the actual moving state deviates from the target moving state increases, in order to reduce the deviation between the actual moving state and the target moving state;

a steering torque application module that applies a steering torque based on at least the time-dependent steering control amount;

a driving operation detection module that detects a predetermined driving operation by a driver, the predetermined driving operation being a driving operation that causes the actual moving state to deviate from the target moving state; and a control module that reduces an influence of the time-dependent steering control amount on the steering torque to be applied when the predetermined driving operation by the driver is detected, wherein the control module reduces the influence of the time-dependent steering amount when the driving operation that causes the actual moving state to deviate from the target moving state detected by the driving operation detection module continues for at least a predetermined time.

* * * * *